Aug. 8, 1950   S. S. FIELD   2,517,647
PROPORTIONING DEVICE
Filed Jan. 12, 1948

INVENTOR.
SYDNEY S. FIELD
BY
Darby & Darby
ATTORNEYS

Patented Aug. 8, 1950

2,517,647

UNITED STATES PATENT OFFICE 2,517,647

PROPORTIONING DEVICE

Sydney S. Field, New York, N. Y.

Application January 12, 1948, Serial No. 1,880

1 Claim. (Cl. 33—97)

An object of this invention is to provide a simple instrument with which the operator may determine what portion of an illustration may be reduced or enlarged to fit in a predetermined space. The use is particularly suited to artists, printers, photographers, and illustrators in the layout of magazines, books, advertisements, and newspapers. Many similar uses will be obvious from the following description of the device.

In the drawing—

Figure 3:
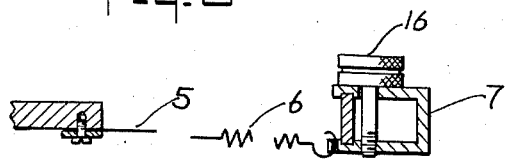
Figure 3 is a detailed section along the line 3—3 of Figure 1.

My device comprises a right-angle frame of suitable material, such as metal. The top bar 1 and side bar 2 of the frame are marked off in inches reading from their intersection. This marking may be on the bars or on separately mounted scales 4, as shown. Fastened to the outer faces of the frame is an arcuate bar 3, a quarter-circle in length, with a radius equal to the length of bars 1 and 2. This arcuate bar could be elliptical or other curved form, although it will be seen that the circular section maintains equal tension on the divider 5 at all positions and is hence preferred. One end of a divider 5, preferably of fine wire, is pivotally mounted at the intersection of bars 1 and 2 and the other end is attached to a helical spring 6, which in turn is attached to a clip 7 which is slidably mounted on bar 3, and may be fixed at any position by set screw 16 which is threaded into the bottom portion of said clip, with its shank loosely passing through the upper portion. Figure 3 shows the details of the divider arrangement. The divider moves in a plane beneath the arms 8 and 9, avoiding interference between movable parts.

Figure 1:
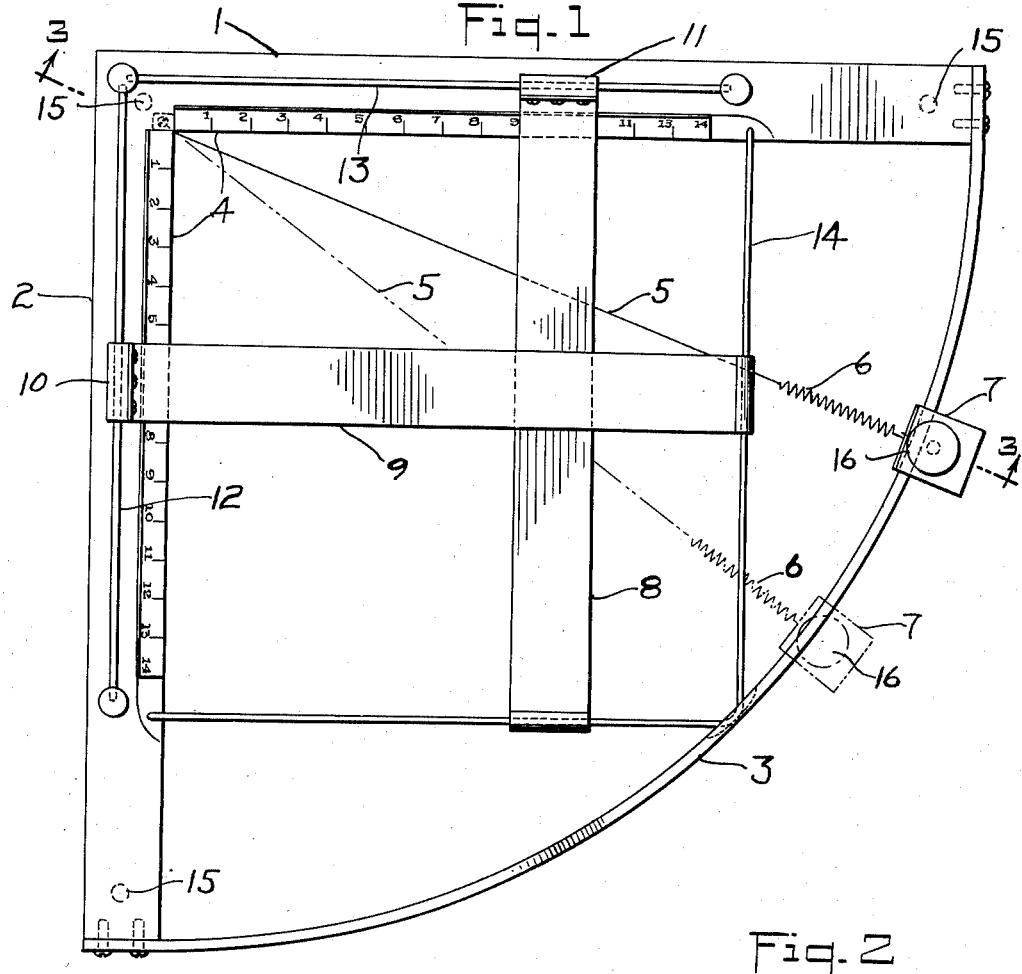
Figure 1 is a plan view of my invention.
Figure 2:
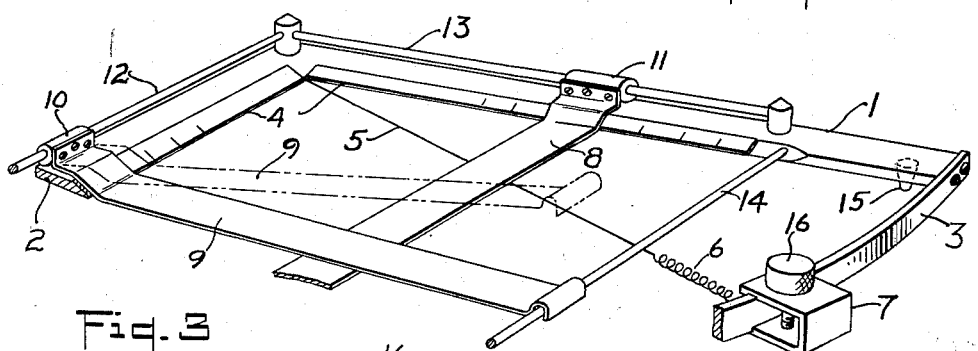
Figure 2 is a partial perspective view, partly in section.

Arms 8 and 9 are fastened to cylinders 10 and 11. Cylinders 10 and 11 slide on the guide rods 12 and 13 which are mounted on bars 2 and 1, respectively. Cylinders 10 and 11 have spring clips on their inside diameters bearing against the surfaces of rods 12 and 13 which maintain arms 8 and 9 perpendicular to the frame so that their intersection is a right angle. Arm 8 and 9 are free to move upwardly, as illustrated in broken lines in Figure 2, with respect to arm 9, as the cylinders 10 and 11 rotate on the guide rods 12 and 13. The outer end of each arm 8 and 9 is formed into a U-shape and rests on retaining rod 14 which is attached to the frame.

The frame is supported on three feet 15 to allow a desired amount of clearance between the device and the work to permit movement of the divider 5 and arms 8 and 9 without disturbing the work.

This device permits the operator to determine the portion of a field of view which he can insert in a predetermined space, on enlarged or reduced scale, when he desires to show only a part of a larger field; or when he desires to use the entire field, but does not know whether the proportions are the same. It thus avoids the necessity of figuring proportions mathematically.

When using the device, the operator will know his available space; for example, suppose he has an area six inches long by four inches wide to be filled. He will set one arm 8 or 9 at six inches and the other arm at four inches, and then adjust clip 7 so that divider 5 passes under the point of intersection of arms 8 and 9. He next positions his illustration with one corner of the portion he desires at the intersection of the frames 1 and 2, and adjusts arms 8 and 9 as required to include the portion of the view wanted. In making this adjustment, the intersection of arms 8 and 9 is kept at a point on the divider 5 so the proportion of length to breadth within the rectangle formed by the arms 8 and 9 and frames 1 and 2 is always the same. When the desired portion of the view to include within the rectangle is decided upon, the illustration may be marked to indicate this portion, which can then be enlarged or reduced as necessary to fit the six-by-four inch space. The operator, therefore, has a view of the portion of the illustration to be used in exact proportion to its finished size.

It will be obvious to those skilled in the art that my device is capable of various modifications and I do not desire, therefore, to be restricted to the particular details shown and described, but only within the scope of the appended claim.

What is claimed is:

A proportioning device comprising a pair of frame members forming a right-angle frame, transversely slidable rigid arms mounted on said frame to intersect at a right angle thereby forming with said frame members a rectangular opening, an arcuate member fastened to said frame members, a clip slidably mounted on said arcuate member, a flexible wire divider having one end fastened pivotally to the intersection of said frame members, and a tension spring fastened to said clip, the other end of said divider being fastened to said tension spring, said transversely slidably arms being respectively pivotally mounted on said frame members to permit raising their ends, and a pair of stationary rods fixed to and respectively parallel to said pair of frame members and underlying the ends of said slidable arms to provide a rest therefor without impairing the ready slidability of said arms.

SYDNEY S. FIELD.

REFERENCES CITED

The following references are of record in the file of this patent:

UNITED STATES PATENTS

| Number | Name | Date |
|---|---|---|
| 633,263 | Grant | Sept. 19, 1899 |
| 754,086 | Nichols | Mar. 8, 1904 |
| 1,330,353 | Smith | Feb. 10, 1920 |
| 1,442,710 | Webster | Jan. 16, 1923 |
| 1,736,342 | Giehler | Nov. 19, 1929 |
| 2,190,947 | Kinzler | Feb. 20, 1940 |